No. 612,856. Patented Oct. 25, 1898.
P. C. MABURY.
GRASS CATCHER FOR LAWN MOWERS.
(Application filed Jan. 14, 1898.)
(No Model.)
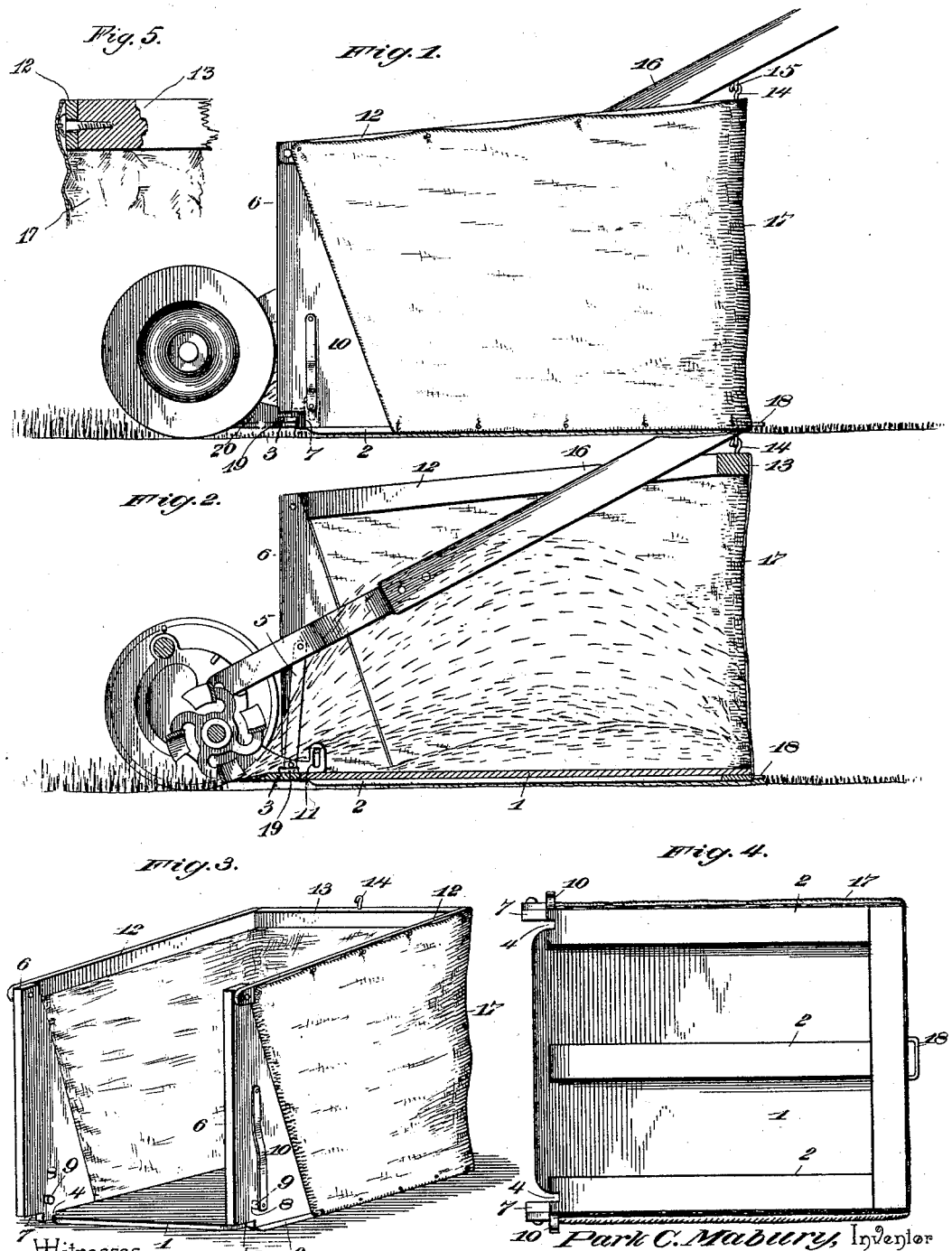

UNITED STATES PATENT OFFICE.

PARK C. MABURY, OF SAN JOSÉ, CALIFORNIA.

GRASS-CATCHER FOR LAWN-MOWERS.

SPECIFICATION forming part of Letters Patent No. 612,856, dated October 25, 1898.

Application filed January 14, 1898. Serial No. 666,677. (No model.)

*To all whom it may concern:*

Be it known that I, PARK C. MABURY, a citizen of the United States, residing at San José, in the county of Santa Clara and State of California, have invented a new and useful Grass-Catcher for Lawn-Mowers, of which the following is a specification.

It is the purpose of the present invention to provide a catcher which can be readily applied to lawn-mowers of different makes with but few changes, if any, excepting such as are necessary to fasten the attachment to the mower-frame.

The grass-catcher is light, collapsible, so as to fold into a small compass when not required for immediate use, effective for the purpose designed, and capable of being readily applied to and disconnected from a mower as required.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation showing the catcher applied to a lawn-mower. Fig. 2 is a longitudinal section. Fig. 3 is a perspective view of the catcher. Fig. 4 is a view of the catcher inverted. Fig. 5 is a detail section to show connection between the side and rear bars of the frame.

Similar numerals of reference indicate corresponding parts in all the figures of the drawings.

The catcher comprises a bottom or platform 1, of thin wood or other light material, which is reinforced by longitudinally-disposed strips 2, firmly attached to its lower side, the front ends of the strips being beveled to admit of them riding over obstructions when the device is in service. These strips 2 constitute runners and trail upon the ground as the catcher is advanced thereover. In the form of mower here shown the ledger-blade-supporting bar is numbered 19 and the ledger-blade is numbered 3. The front end of the bottom 1 comes in the rear of the ledger-blade and its top side comes about flush with the said blade. Notches 4 are provided in the front end of the part 1 near its edges to receive the usual mower-frame brackets 20 for supporting the usual roller. Straps 5, connecting the brackets 20 with the handle-bow, cause the mower-frame and handle to move together, so that upon raising or lowering the handle the mower-frame will be correspondingly elevated or depressed and cause a like movement of the catcher, which is attached to said frame in the manner hereinafter fully described.

Standards 6 are rigidly attached at their lower ends to the front portion of the bottom or platform 1, and their lower front corners are cut away, as shown at 7, to receive the nuts by means of which the ledger-blade 3 is secured to the supporting-bar 19. The rear edges of the standard incline upwardly and forwardly, whereby the standards are tapered toward their upper ends. Transverse openings 8 are provided in the lower ends of the standards to receive pins 9, attached to the free ends of springs 10, connected with the standards. These pins 9 project through the openings 8 and beyond the inner sides of the standards 6 and enter the openings 11 in the brackets 20, which openings usually receive the journals of the ground-roller, the latter being omitted when the attachment is placed in position.

Longitudinal side bars 12 are pivotally connected at their front ends with the upper portions of the standards 6, and are united at their rear ends by a cross-bar 13, the latter being provided midway of its ends with a hook 14 to engage with an eye 15, applied to the lower side of the handle 16 of the mower. The fastenings which connect the rear ends of the longitudinal bars 12 with the extremities of the cross-bar 13 admit of the latter turning, so as to adapt itself to the elevation of the rear end of the handle and yet remain parallel to a given position.

A piece of duck, canvas, or textile 17 is secured to the standards 6, longitudinal bars 12, cross-bar 13, and the edges of the bottom or platform 1 and constitutes flexible back and side walls to the catcher and admits of the latter folding, so as to occupy a small space when not in use, which is desirable for storing and transportation.

When applying the catcher to a lawn-mower, the ground-roller is omitted and the brackets 20 are connected with the bow of the handle by straps or like means, as shown at 5. When the catcher is adjusted to the mower, the front end of the bottom or platform 1 comes in the rear of the knife or cutter blade 3 and the locking-pins 9 spring into the holes 11 of the brackets and the hook 14 is engaged with the eye 15. As the mower is impelled over the ground the grass thrown rearward by the cutting mechanism is received by the catcher and the latter trails upon the ground upon the runners or strips 2. To detach the catcher from the mower, the hook 14 is disengaged from the eye 15 and the locking-pins 9 sprung out of engagement with the openings 11, and the device is handled by means of a grip 18, applied to the rear end of the bottom or platform 1.

The openings 11 in the side brackets of the lawn-mower frame are vertically elongated, whereby when the pins 9 are engaged therewith the receptacle-frame is capable of vertical movement at its front end and is also capable of pivotal or swinging movement. The weight of the front end of the receptacle is carried by the runners 2.

Having described my invention, what I claim is—

1. A grass-catcher for lawn-mowers comprising a rigid bottom, standards at the front end of the bottom, longitudinal bars pivotally connected at their front ends with the upper ends of the standards, a cross-bar connecting the rear ends of the longitudinal bars, and a textile connecting the standards, bottom, longitudinal and cross bars, and forming a flexible back and sides, substantially as shown for the purpose specified.

2. A grass-catcher for lawn-mowers having a bottom, longitudinal side bars arranged above the plane of the bottom and pivoted at their front ends, a cross-bar connecting the rear ends of the longitudinal side bars, and pivotally connected therewith for rocking movement, means carried by the cross-bar for engagement with the handle of a lawn-mower, and a textile connecting the bottom with the side and cross bars to form flexible back and side walls, substantially as specified.

3. The combination with a lawn-mower having side brackets provided with vertically-elongated openings, of a grass-catcher having a bottom provided with runners and flexible side and back walls rising from the edges of the bottom, and transverse pins on the frame of the grass-catcher engaged with said elongated openings in the brackets of the lawn-mower, to allow pivotal and vertical movement of the bottom of the grass-catcher, substantially as specified.

4. In combination, a lawn-mower, a platform, standards secured to the sides of the platform at its front end and having their lower forward corners cut away to receive the nuts of the ledger plate or knife, springs attached at one end to the standards, pins affixed to the free ends of the springs and operating in openings of the said standards and engaging with openings of the mower-frame, longitudinal bars having pivotal connection with the upper ends of the standards, a cross-bar connecting the rear ends of the longitudinal bars and adapted to be detachably connected with the mower-handle, and a textile secured to the platform, standards, cross and longitudinal bars and forming a flexible back and sides, substantially as set forth.

In testimony that I claim the foregoing as my own I have hereto affixed my signature in the presence of two witnesses.

PARK C. MABURY.

Witnesses:
 J. S. McGINNIS,
 JAS. R. LOWE.